May 12, 1964 G. W. COLEMAN ETAL Re. 25,577

REFUSE TRUCK BODY AND LOADER

Original Filed April 7, 1959 4 Sheets-Sheet 1

INVENTORS.
Joseph M. Quinn, Jr.
Gerald W. Coleman.
BY
Harness, Dickey & Pierce.
ATTORNEYS.

REFUSE TRUCK BODY AND LOADER

Original Filed April 7, 1959 4 Sheets-Sheet 2

INVENTORS.
Joseph M. Gwinn, Jr.
Gerald W. Coleman.
BY
Harness, Dickey & Pierce.
ATTORNEYS.

May 12, 1964 G. W. COLEMAN ETAL Re. 25,577

REFUSE TRUCK BODY AND LOADER

Original Filed April 7, 1959 4 Sheets-Sheet 3

INVENTORS.
Joseph M. Gwinn, Jr.
Gerald W. Coleman.
BY
Harness, Dickey & Pierce
ATTORNEYS.

REFUSE TRUCK BODY AND LOADER

Original Filed April 7, 1959 4 Sheets-Sheet 4

INVENTORS.
Joseph M. Gwinn, Jr.
Gerald W. Coleman.
BY
Karness, Dickey & Pierce
ATTORNEYS.

United States Patent Office

Re. 25,577
Reissued May 12, 1964

25,577

REFUSE TRUCK BODY AND LOADER

Gerald W. Coleman, Detroit, and Joseph M. Gwinn, Jr., Dearborn, Mich., assignors to Gar Wood Industries, Inc., a corporation of Michigan Original No. 3,044,644, dated July 17, 1962, Ser. No. 804,826, Apr. 7, 1959. Application for reissue Nov. 13, 1962, Ser. No. 237,793
1 Claim. (Cl. 214—83.3)

Matter enclosed in heavy brackets [ ] appears in the original patent but forms no part of this reissue specification; matter printed in italics indicates the additions made by reissue.

This invention relates generally to refuse handling trucks and more particularly to a refuse loader which is an improvement on the type disclosed in U.S. Patent No. 2,879,906.

Refuse loaders of the type to which this invention relates are mounted on a tailgate which is pivotally mounted on the rear end of the truck. The loader consists of a sweep panel which sweeps refuse from a trough in the tailgate to a position in substantially horizontal alignment with a loading opening in the rear end of the truck body. A ram panel is moved across the sweep panel toward the loading opening so as to push the refuse off the sweep panel and through the opening into the truck body. When the truck body has been fully loaded, it is driven to a dumping location, and the tailgate is swung upwardly to an open position, so that refuse can be dumped out of the body through the opening in the rear end. Prior refuse loaders have included separate power means for operating the ram panel and the sweep panel and for opening the tailgate. Since each motor, hydraulic cylinder, or other form of power means, adds weight to the truck and makes it more expensive, an elimination or consolidation of any of the power means is always desirable. The primary object of this invention, therefore, is to utilize one of the panel operating power means for opening the tailgate. This is accomplished by moving the panels into positions in which the sweep panel blocks movement of the ram panel in a direction away from the loading opening. After the sweep panel has been locked in this position, the ram panel cylinders which are mounted on the truck body are extended. Extension of these cylinders normally moves the ram panel in a retracting direction but since movement in such a direction is blocked, extension of the cylinders operates to swing the tailgate upwardly and rearwardly to an open position.

A further object of this invention is to locate the ram panel relative to the operating cylinders therefor such that on movement of the pivotally mounted ram panel in a compressing direction, the moment arm of the applied force on the ram panel is continually increased to thereby increase the effect of the force for moving the ram panel in a refuse compressing direction. This arrangement makes it possible to use smaller operating cylinders and obtain faster ram panel operating speeds.

A further object of this invention is to provide a loader attachment which is simple in construction, economical to manufacture, and efficient in operation in compacting refuse into a loader body.

Further objects, features and advantages of this invention will become apparent from a consideration of the following description, the appended claims and the accompanying drawing in which:

Figure 2:
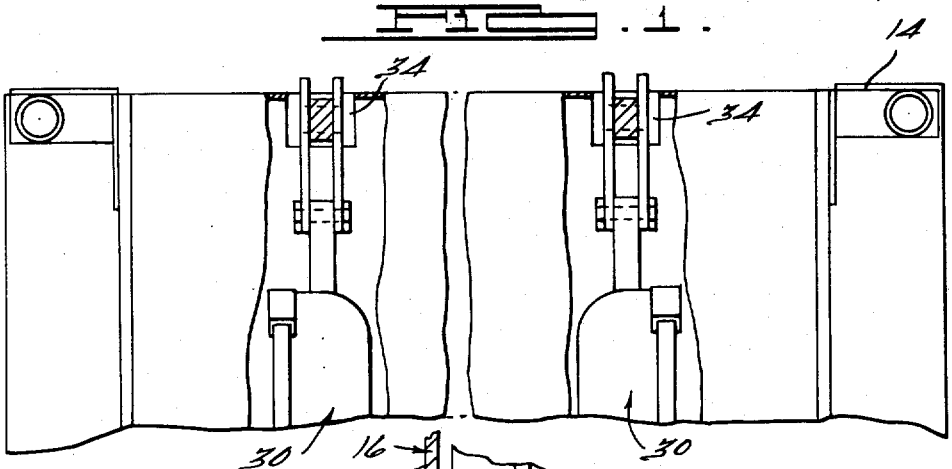
FIG. 2 is a fragmentary side elevational view of the rear end of the dump body and the tailgate, with parts broken away to show the location of the ram and sweep panels immediately prior to forward movement of the ram panel in a refuse compressing direction.
Figure 3:
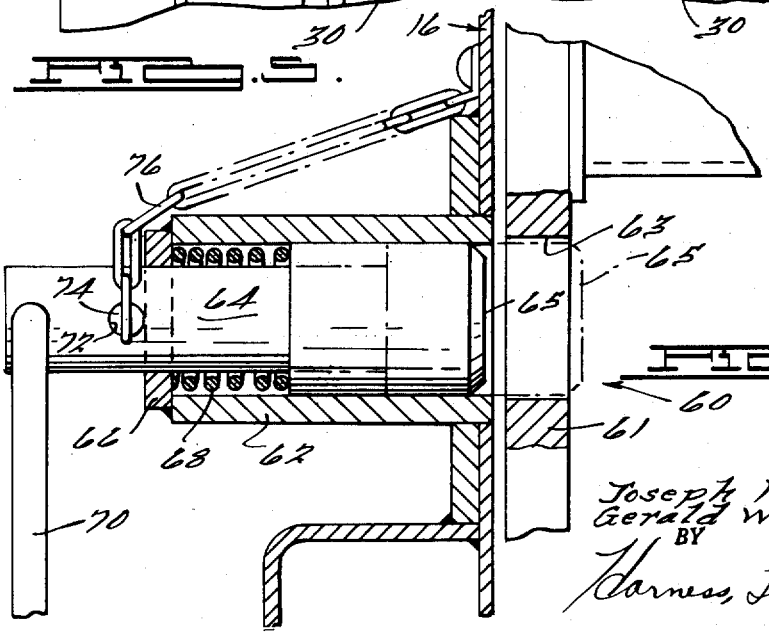
FIG. 3 is a fragmentary side elevational view of the dump body and the tailgate, illustrated similarly to FIG. 2, showing the ram panel at slightly less than the full forward position, with the sweep panel moved to a locked position blocking movement of the ram panel in a rearward direction.
Figure 2:
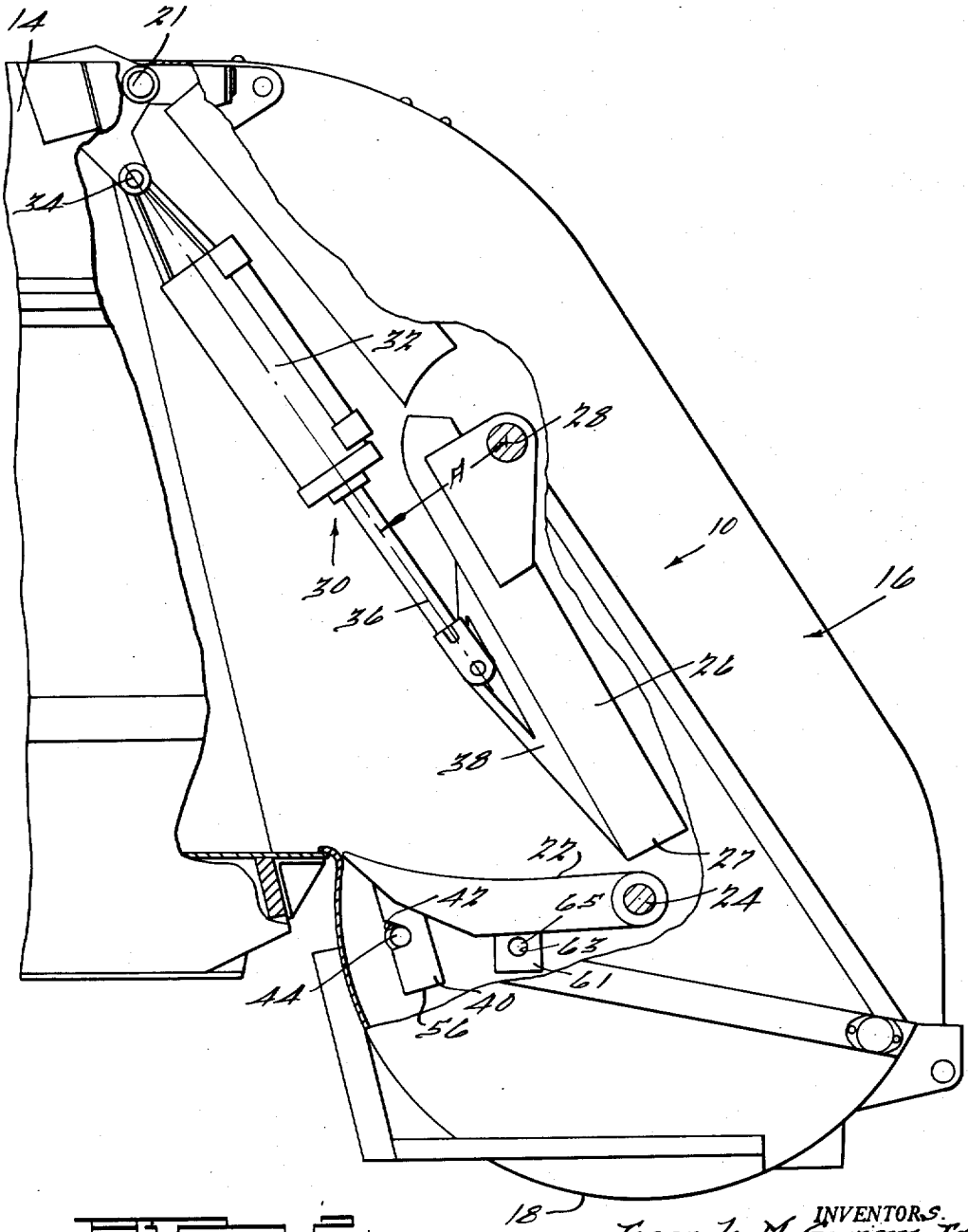
Figures 3, 4:
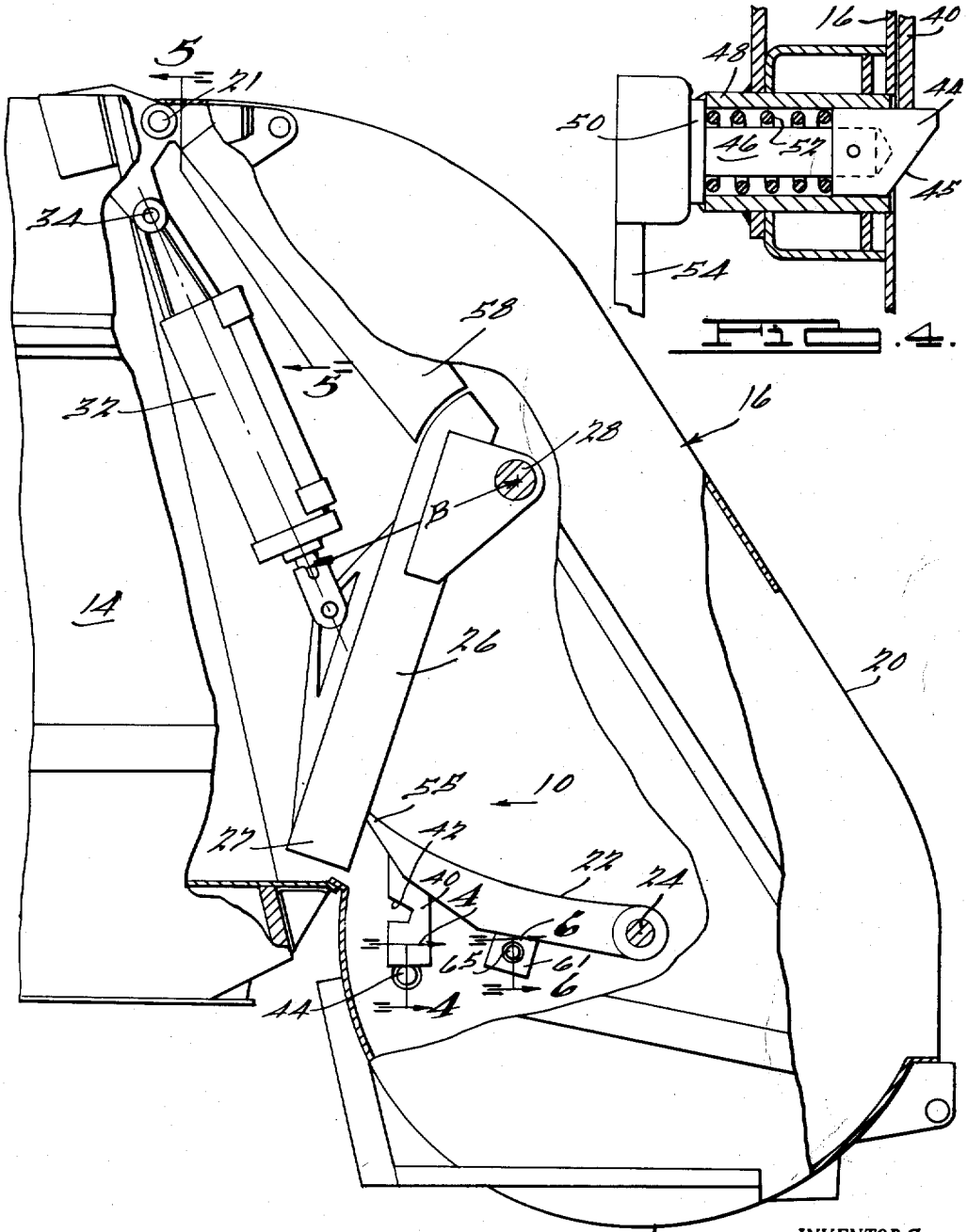
Figure 7:
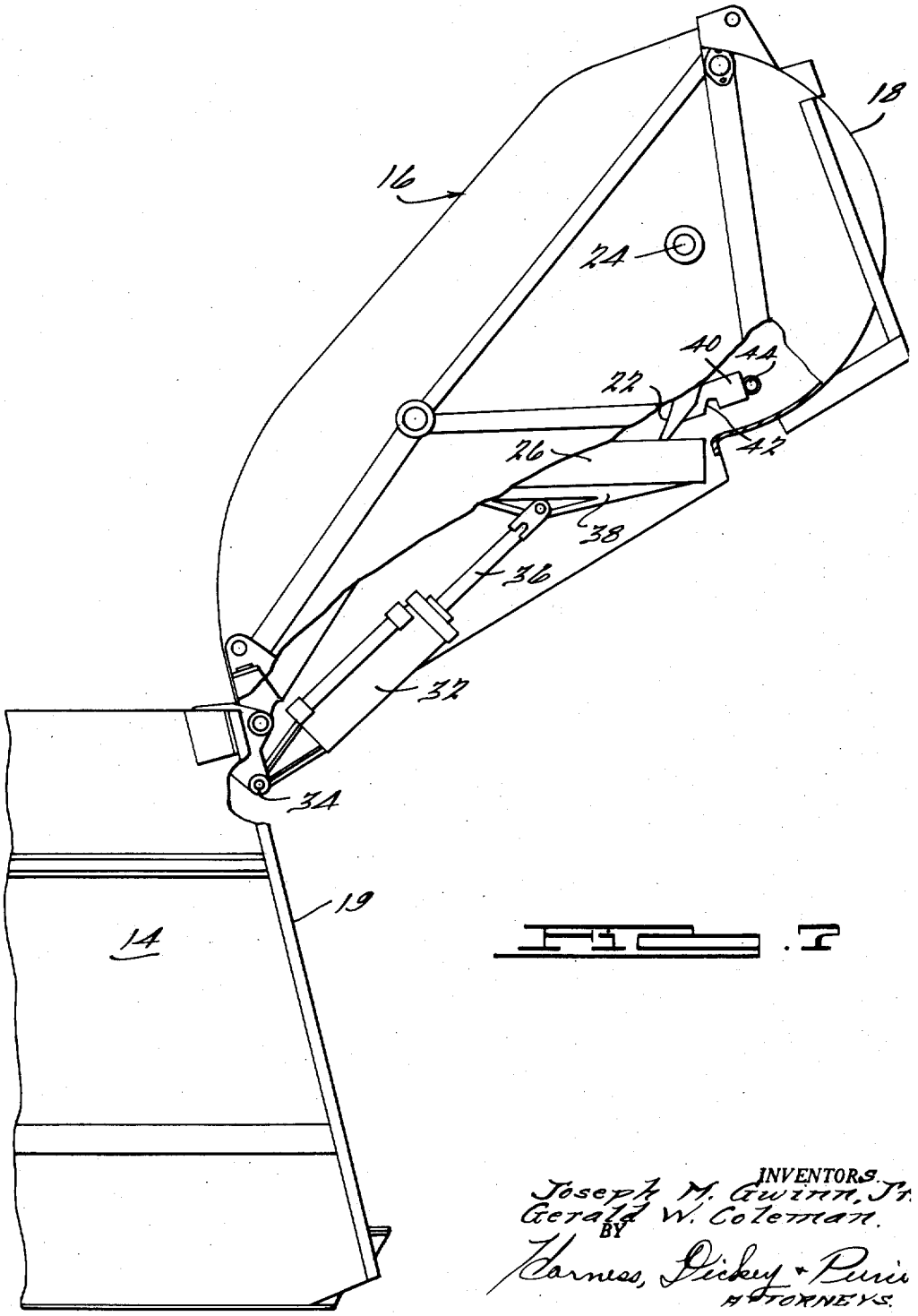

FIGS. 4, 5 and 6 are fragmentary sectional views looking along the lines 4—4, 5—5 and 6—6, respectively, in FIG. 3; and FIG. 7 is a fragmentary side elevational view of the dump body and tailgate, illustrated similarly to FIGS. 2 and 3, showing the tailgate moved to an open position.

Figure 1:
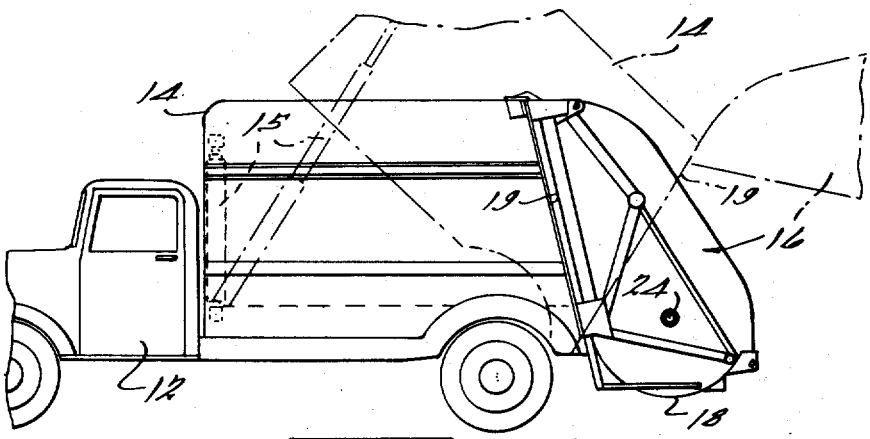
FIGURE 1 is a side elevational view of a refuse truck having a dump body and a tailgate, showing the dump position of the body and the open position of the tailgate in broken lines.

With reference to the drawing, the refuse loader of this invention is illustrated applied to a truck 12 having a hollow body 14 pivotally mounted at its rear end on the rear end of the truck for up and down movement between a horizontal transport position, shown in full lines in FIG. 1, and an upwardly moved dump position shown in broken lines. A telescopic hoist 15 is pivotally mounted at its lower end on the truck 12 and is pivotally connected at its upper end to the front end of the body 14 for moving the body between the two positions illustrated in FIG. 1. The loader of this invention, indicated generally at 10 in FIG. 2, is incorporated in a tailgate 16 mounted at one of its ends on pivots 21 carried by the rear end 19 of the body 12, adjacent the top side thereof. The rear end of the body 14 is open so that refuse in the body 14 is dumped therethrough in the downwardly and rearwardly inclined dump position of the body 14.

The tailgate 16 has a trough or hopper 18 at its lower end into which refuse is dumped through a loading opening 20 in the rear side of the tailgate 16. A sweep panel 22 is mounted at its inner end on suitable shaft means 24 for full circle rotation in a clockwise direction, as viewed in FIG. 2, through the hopper 18 to the position shown in FIG. 2 in which it supports the refuse for movement substantially horizontally into the body 14.

A ram panel 26 is mounted at its upper end on a horizontal shaft means 28 carried by the tailgate 16. The panel 26 is movable about the axis of shaft means 28 between a retracted position shown in FIG. 2 and a refuse compressing or forward position slightly forward of the position shown in FIG. 3. In the full forward position of the ram panel 26, it is out of the way of the sweep panel 22 during a subsequent full circle rotation thereof through the trough 18. When the sweep panel 22 has been moved to its refuse supporting position shown in FIG. 2, movement of the ram panel 26 between its retracted position shown in FIG. 2 and its forward position is effective to provide for a movement of the lower end 27 of the ram panel 26 across the sweep panel 22 so that the refuse thereon is pushed off the sweep panel into the truck body 14. As best appears from a comparison of the FIGS. 2 and 3, the ram panel 26 has its supporting shaft means 28 located so that a vertical plane passing through the shaft means 23 is between the vertical planes which extend through the lower end 27 of the ram panel 26 in the retracted and substantially forward positions thereof shown in FIGS. 2 and 3, repectively. As a result, the path of travel of the lower end 27 of the ram panel 26 is on an arc at the lower side of a circle extending about the shaft means 28 and of a diameter equal to the length of the ram panel 27. This arrangement provides for substantially horizontal movement of the panel end 27.

The ram panel is moved by a pair of hydraulic cylinder assemblies 30, FIGS. 2, 3 and 5, each of which consists of a cylinder member 32 mounted at its upper end on a horizontal pivot 34 carried by the rear end of the truck body 14 and a piston rod 36 pivotally connected at its lower end to a plate or bracket 38 secured to one end of the ram panel 26.

As shown in FIG. 2, when the ram panel 26 is in its retracted position, the distance between the axis of the shaft means 28 and the line of application of the force applied to the ram panel 26 by the cylinder assemblies 30, in a direction perpendicular to the line of application of this force, is indicated at A. This distance A represents the moment arm for the force of the cylinder assemblies 30 on the panel 26 tending to rotate the panel 26 about the shaft means 28. The shaft means 28 is located with respect to the pivots 34 which support the cylinders 32 such that this moment arm is continually increased during movement of the ram panel 26 toward its forward position. As shown in FIG. 3 the moment arm has been increased to the distance indicated at B when the ram panel 26 has been moved almost to its full forward position.

To prevent the sweep panel 22 from being moved in a return or counter-clockwise direction as viewed in FIG. 2 during movement of the ram panel across the sweep panel, a pair of latch plates 40 are secured to the opposite ends of the sweep panel 22 so that the latch plates 40 extend downwardly in the horizontal position of the sweep panel 22 shown in FIG. 2. Each latch plate 40 has a notch 42 formed therein of a size such that a latch pin 44 will fit in the notch 42. Two latch pins 44, corresponding to the latch plates 40, are provided, although only one of the latch pins 44 is shown in the drawing and described in detail since they are identical.

As shown in FIG. 4, each latch pin 44 is mounted on the inner end of a plunger 46 and is guidably supported in a tubular support 48 secured to the side wall of the tailgate 16. The tubular support 48 is closed at its outer end by a plate 50 and a spring 52, positioned about the plunger 46, extends between the pin 44 and the plate 50. A handle 54 is connected to the outer end of the plunger 46 so that the pin 44 can be retracted, against the action of the spring 52 when desired.

The lower face 45 of each pin 44 is inclined and functions as a cam face to provide for retraction of the pin 44 during upward movement of the corresponding latch plate 40 past the pin 44. When the sweep panel 22 has been moved in a clockwise direction as viewed in FIG. 2, to a position in which the notches 42 in the latch plates 40 are horizontally aligned with the corresponding pins 44, the pins 44 are moved inwardly by their springs 52 so that they extend into the notches 42. In these positions, the latch pins 44 act as stops to prevent movement of the sweep panel 22 in a counterclockwise direction from its position shown in FIG. 2 but do not have any effect on clockwise rotation of the sweep panel 22.

In the operation of the loader 10, after the sweep panel 22 has been moved through the trough 18 to the position shown in FIG. 2, the ram panel 26 is moved from its retracted position shown in FIG. 2 to its forward position so as to push the refuse off the sweep panel 22, and into the body 14 through the open rear end 19 thereof. Since the force of the cylinders 30 on the ram panel 26 which is effective to rotate the ram panel 26 with respect to its supporting shaft 28 is continually increased during forward movement of the ram panel 26, smaller cylinder assemblies 30 can be used than could be used if the moment arm stayed the same or was decreased.

With the ram panel 26 in the forward or compressing position, the sweep panel 22 is rotated in a clockwise direction through a small angle to position the outer edge 55 of the sweep panel slightly above the lower end 27 of the ram panel 26. In this position of the sweep panel 22, it effectively blocks the ram panel 26 against return movement toward its retracted position shown in FIG. 2, as illustrated in FIG. 3. This is desirable, during transport of the truck 12 from one loading position to the next and from the last loading location to a dump location, to support and lock the ram panel 26 in a position in which it co-operates with a shield 58 which extends between the upper end of the ram panel 26 and the top end of the tailgate 16 to close the rear opening of the truck body 14. Since the refuse in the truck body 14 has been compressed by the ram panel 26, it exerts considerable force on the ram panel 26 tending to move it toward its retracted position shown in FIG. 2. Consequently, there is a likelihood that unless the ram panel 26 is mechanically locked in its FIG. 3 position, by means of the sweep panel 22, sufficient fluid will leak past the control valve for the cylinder assemblies 30 and the other hydraulic connections for the cylinder assemblies 30 to permit movement of the ram panel 26 toward its retracted position sufficient to allow some escape of refuse from the truck body 14 back into the trough 18. In addition, if the ram panel 26 moves toward its retracted position, it is in the path of travel of the sweep panel 22 during the next loading operation.

To support the sweep panel 22 in its blocking position shown in FIG. 3, the lower ends 56 of the latch plates 40 are located such that they are adjacent to and above the top sides of the latch pins 44 in the blocking position of the sweep panel 22. In these positions, the latch plate ends 56 are engageable with the top sides of the pins 44 to prevent the sweep panel 22 from swinging downwardly to its weight and because of internal leakages in the sweep panel hydraulic drive and controls.

After the truck 14 has been fully loaded, it is transported to a dumping location where the refuse is removed from the body 14. Suitable latches (not shown) are provided for connecting the lower end of the tailgate 16 to the truck body 14 and these latches are first released. The sweep panel 22 is then positively locked in its blocking position, shown in FIG. 3, against movement in either direction, by means of a latch assembly 60 shown in FIG. 6. Intermediate its inner and outer edges, the sweep panel 22 carries a third latch plate 61 which extends downwardly from the underside of the sweep panel 22 in the position of the sweep panel 22 illustrated in FIG. 3. The latch plate 61 is provided with an opening 63 and in the position thereof shown in FIG. 3, this opening 63 is in horizontal alignment with a pin 65 which forms a part of the latch assembly 60.

The pin 65 is mounted on the inner end of a reduced diameter plunger 64 and is guidably supported in a tubular guide member 62 carried by one side wall of the tailgate 16. The outer end of the guide member 62 is closed by a plate 66 and a coil spring 68 extends about the plunger 64 between the pin 65 and a closure plate 66 for normally urging the pin 65 into the opening 63. A handle 70 is mounted on the outer end of the plunger 64 to limit inward movement thereof and to facilitate retraction of the pin 65 to a position to one side of the path of travel of the latch plate 61. A retainer pin 74 carried by a chain 76 secured to the tailgate 16 is extended through an opening 72 in the plunger 64 for engagement with the plate 66 to prevent inward movement of the plunger 64 to a position in which the pin 65 is in the path of travel of the latch plate 61.

During use of the loader 10 to load the body 14, the pin 74 is retained in the opening 72 to keep the pin 65 in a retracted position out of the path of travel of the latch plate 61. However, when the tailgate 16 is to be opened, the pin 74 is removed from the opening 72 after the sweep panel 22 has been moved to a position in which the opening 63 is aligned with the pin 65. After the pin 65 has been moved into the opening 63, as shown in broken lines in FIG. 6, the sweep panel 22 is effectively locked in its FIG. 3 position.

The cylinder assemblies 30 are then operated to extend the piston rods 36. This action of the cylinder assemblies 30 is normally effective to return the ram panel 26 from its forward position to its retracted position.

However, since the ram panel is effectively blocked against such movement, extension of the piston rods 36 is effective to move the tailgate 16 in a counterclockwise direction about the pivotal supports 21 therefor on the body 14. In other words, the cylinder assemblies 30, which are supported on the body 14, apply forces to the ram panel 26, and since the ram panel 26 is blocked against any movement, the only movement that can take place is movement of the tailgate 16. The hydraulic cylinder assemblies 30, when fully extended as shown in FIG. 7, have moved the tailgate 16 to a position in which it will not interfere with discharge of refuse through the open rear end 19 of the body 14. Consequently, when telescopic hoist 15 is extended to tip the body 14 upwardly and rearwardly, the refuse therein is dumped out the open rear end 19 of the body 14.

After the body 14 has been emptied, the piston rods 36 are slowly retracted to permit the weight of the tailgate 16 to provide for its movement in a return direction to a position closing the rear end of the body 14. The latches (not shown) are then operated to connect the lower end of the tailgate 16 to the body 14, the pin 65 is retracted, and the retaining pin 74 is inserted in the opening 72 to hold the pin 65 in a retracted position and the control apparatus described in copending application Serial No. 635,487, now Patent No. 2,975,913, owned by the assignee of this invention, is manipulated to provide for a cyclical operation of the panels 22 and 26 to load refuse from the hopper 16 into the body 14.

As described in said application, a cycle of operation of the loader begins with the panels 22 and 26 in substantially the positions shown in FIG. 3, although the cycle may start with the panel 22 in the position shown in FIG. 2 if this cycle immediately follows the preceding cycle without any intervening transport or dumping of the body 14. With the panel 26 in the position shown in FIG. 3, the panel 22 is rotated in a clockwise direction as shown in FIG. 3 so as to sweep the refuse in the trough 18 ahead of the panel 22. During this movement of the sweep panel 22, the ram panel 26 is retracted toward its position shown in FIG. 2, with the sweep panel 22 staying continuously behind the panel 26 until it is out of the path of the panel 26. When the panel 22 has been moved to its position shown in FIG. 2, the refuse from the trough 18 has been moved to a supported position on the panel 22 in substantially horizontal alignment with the open rear end of the body 14. The panel 26 is then moved across the panel 22 so as to push the refuse from its supported position on panel 22 through the open rear end of the body 14. In the full forward position of the ram panel 26, shown substantially in FIG. 3, the ram panel 26 is out of the way of the sweep panel 22 so that the next cycle of operation can be commenced. In the event the body 14 is to be transported or dumped, the sweep panel 22 is moved to the position shown in FIG. 3 so as to block the ram panel 26 against any rearward movement which would permit escape of refuse from the body 14 into the trough 18.

From the above description, it is seen that this invention provides an assembly of the loader 10 with the truck body 14 whereby the cylinder assemblies 30 are used both for operating the ram panel 26 to compress refuse into the body 14 and for moving the tailgate 16 to an open position so that refuse can be dumped from the body 14. The requirement for separate power means for operating the ram panel 26 and opening the tailgate 16 is thus eliminated. Furthermore, the ram panel 26 and the cylinder assemblies 30 are located such that during forward movement of the ram panel 26, the moment arm of the force exerted by the cylinder assembly 30 tending to rotate the ram panel 26 is continually increased to thereby provide for an efficient utilization of the force of the cylinder assemblies 30.

It will be understood that the specific construction of the improved refuse loader which is herein disclosed and described is presented for purposes of explanation and illustration and is not intended to indicate limits of the invention, the scope of which is defined by the following claims.

What is claimed is:

[1. In a fuse handling vehicle which includes a hollow dump body adapted to receive refuse for transport and having an open rear end, a tailgate assembly pivotally mounted on said rear end for up and down swinging movement about a horizontal axis, said tailgate assembly including a loading trough, a sweep panel mounted for rotation through said trough to a position supporting refuse for movement into said body through said open rear end, a ram panel mounted for movement of a portion thereof across said sweep panel for moving refuse thereon into said body, power means mounted on said body and connected to said ram panel for moving the ram panel in one direction to a position forwardly of said sweep panel in said refuse supporting position thereof so that said sweep panel is movable to a position engaging the rear side of said ram panel for preventing movement thereof in an opposite direction, said power means being operable to move said ram panel in said opposite direction when said sweep panel is held in engagement with the rear side of the ram panel to prevent rearward movement thereof relative to said trough whereby said tailgate assembly is rotated about the pivotal mounting therefor in a direction away from said body rear end.]

[2. In a refuse handling vehicle which includes a hollow dump body adapted to receive refuse for transport and having an open rear end, a tailgate assembly mounted on the rear end of said dump body for movement toward and away from said rear end, and having a front side located adjacent said open rear end during loading of refuse into said body; means on said tailgate assembly for transferring refuse therefrom to said body, said transfer means including a member mounted on said tailgate assembly and movable toward said open rear end to a position adjacent said front side of the tailgate assembly, reversible fluid motor means mounted on said body and connected to said transfer member, said fluid motor means being movable in one direction to move said transfer member to said position thereof adjacent said tailgate front side to move refuse into said body, and means for locking said transfer member in said portion so that on operation of said fluid motor means in a reverse direction said tailgate assembly is moved rearwardly away from said open rear end of the body.]

[3. In a refuse handling vehicle which includes a hollow dump body adapted to receive refuse for transport and having an open rear end, a tailgate assembly pivotally mounted at its upper end of the rear end of said dump body for up and down swinging movement about a horizontal axis, means on said tailgate assembly for transferring refuse therefrom to said body, said transfer means including a ram panel mounted for rotation about a horizontal axis such that on movement thereof in one direction it is operable to move refuse from said tailgate assembly into said body, fluid cylinder means connected to said ram panel for moving the ram panel in said one direction, said fluid cylinder means being located with respect to the pivotal axis for said ram panel such that during operation of said fluid cylinder means to rotate said ram panel in said one direction the distance measured in a direction perpendicular to the direction of the force exerted on said ram panel by said cylinder means between said ram panel axis and a line corresponding to the direction and extending through the point of application of said force to said ram panel is continually increased.]

[4. In a refuse handling vehicle which includes a hollow dump body adapted to receive refuse for transport and having an open rear end, a tailgate assembly pivotally mounted on said rear end for up and down swinging movement about a horizontal axis, said tailgate assembly including a loading trough, a sweep panel mounted on said tailgate assembly for rotation through said trough to a position supporting refuse for movement into said body through said open rear end, a ram panel mounted on said tailgate assembly for movement of a portion thereof across said sweep panel in one direction for moving refuse thereon into said body, power means mounted on said body and connected to said ram panel for moving the ram panel in said one direction to a position forwardly of said sweep panel in said refuse supporting position thereof so that said sweep panel is movable to a position in the path of movement of said ram panel in an opposite direction, means on said tailgate assembly for locking said sweep panel in said position, said power means being operable to move said ram panel in said opposite direction so that when said ram panel engages the sweep panel said tailgate assembly is rotated about the pivotal mounting therefor in a direction away from said body rear end.]

[5. In a refuse handling vehicle which includes a hollow dump body adapted to receive refuse for transport and having an open rear end, a tailgate assembly pivotally mounted at its upper end on the rear end of said dump body for up and down swinging movement about a horizontal axis, means on said tailgate assembly for transferring refuse therefrom to said body, means including a hydraulic cylinder mounted on said body and having a piston rod connected to said transfer means so that on movement of the piston rod in one direction relative to the cylinder a portion of said transfer means is moved in one direction across said tailgate assembly to transfer refuse into said body, and means on said tailgate assembly engageable with said portion of the transfer means for limiting movement thereof in an opposite direction so that on movement of said piston rod in an opposite direction said tailgate assembly is swung upwardly and rearwardly to a position out of the way of refuse being dumped from said body.]

[6. In a refuse handling vehicle which includes a hollow dump body adapted to receive refuse for transport and having an open rear end, a tailgate assembly pivotally mounted on said rear end for up and down swinging movement about a horizontal axis, said tailgate assembly including a loading trough, means mounted on said tailgate assembly for movement through said trough to a position supporting refuse for movement into said body through said open rear end, a ram panel mounted on said tailgate assembly for movement of a portion thereof across said refuse supporting means for moving refuse thereon into said body, power means mounted on said body and connected to said ram panel for moving the ram panel, means on said tailgate assembly for locking said ram panel in one position, said power means being operable to apply a force to said ram panel in said one position thereof so that said tailgate assembly is rotated about the pivotal mounting therefor in a direction away from said body rear end.]

[7. In a refuse handling vehicle which includes a hollow dump body adapted to receive refuse for transport and having an open rear end, a tailgate assembly pivotally mounted on said rear end for up and down swinging movement about a horizontal axis, said tailgate assembly including a loading trough, a sweep panel mounted for rotation through said trough to a position supporting refuse for movement into said body through said open rear end, a ram panel mounted for movement of a portion thereof across said sweep panel for moving refuse thereon into said body, power means mounted on said body and connected to said ram panel for moving the ram panel, means for locking said ram panel in one position, said power means being operable to apply a force to said ram panel in said one position thereof so that said tailgate assembly is rotated about the pivotal mounting therefor in a direction away from said body rear end.]

*8. In a refuse handling vehicle which includes a hollow dump body adapted to receive refuse for transport and having an open rear end, a tailgate assembly pivotally mounted on said rear end for up and down swinging movement about a horizontal axis, said tailgate assembly including a loading trough, a sweep panel mounted on said tailgate assembly for rotation through said trough to a position supporting refuse for movement into said body through said open rear end, a ram panel mounted on said tailgate assembly for movement of a portion thereof across said sweep panel in one direction for moving refuse thereon into said body, power means mounted on said body and connected to said ram panel for moving said ram panel in said one direction to a position forwardly of said sweep panel when the latter is in said refuse supporting position whereby said sweep panel is movable to an interfering position in the path of movement of said ram panel in the opposite direction, means on said tailgate assembly for locking said sweep panel in said interfering position, said power means being operable to move said ram panel in said opposite direction so that when said ram panel engages said locked sweep panel said tailgate assembly is rotated about the pivotal mounting therefor in a direction away from said body rear end.*

References Cited in the file of this patent or the original patent

UNITED STATES PATENTS

| | | |
|---|---|---|
| 2,561,608 | Boissonnault | July 24, 1951 |
| 2,675,138 | Reitz | Apr. 13, 1954 |
| 2,703,184 | Barrett | Mar. 1, 1955 |
| 2,748,964 | Murphy | June 5, 1956 |
| 2,879,906 | Gwinn | Mar. 31, 1959 |
| 2,914,205 | Trubinski | Nov. 24, 1959 |
| 2,975,913 | Gwinn et al. | Mar. 21, 1961 |